United States Patent [19]

Hanke

[11] Patent Number: 5,222,826
[45] Date of Patent: Jun. 29, 1993

[54] QUICK ATTACHMENT SYSTEM

[75] Inventor: Rudolph Hanke, Monheim, Fed. Rep. of Germany

[73] Assignee: Hama Hamaphot KG Hanke & Thomas, Fed. Rep. of Germany

[21] Appl. No.: 666,863

[22] Filed: Mar. 8, 1991

[30] Foreign Application Priority Data

Mar. 16, 1990 [DE] Fed. Rep. of Germany ....... 4008529

[51] Int. Cl.$^5$ ............................................... B25G 3/08
[52] U.S. Cl. ................................. 403/381; 403/322; 248/187; 354/293
[58] Field of Search ............... 248/187, 177; 403/381, 403/322, 324; 354/293

[56] References Cited

U.S. PATENT DOCUMENTS

| | | | |
|---|---|---|---|
| 2,840,334 | 6/1958 | Cauthen | 248/187 |
| 3,356,325 | 12/1967 | Schnase | 248/187 |
| 4,570,887 | 2/1986 | Banister | 248/187 |
| 4,929,973 | 5/1990 | Nakatani | 248/187 X |

Primary Examiner—Randolph A. Reese
Assistant Examiner—Harry C. Kim
Attorney, Agent, or Firm—Marshall, O'Toole, Gerstein, Murray & Borun

[57] ABSTRACT

Quick attachment system for an appliance or instrument, e.g. a camera, with a mounting support and an insert connected to the appliance, which carries on its upper boundary surface the appliance to be fixed and is so insertable in the mounting support that, in the inserted state, the upper boundary surface of the insert is located substantially below the upper boundary surface of the mounting support, accompanied by the bracing of the appliance bottom against the upper boundary surface of the mounting support, characterized in that the insert has a square ground plan and trapezoidal cross-section, that the insert can be connected by a separate fastening screw and a twisting-preventing pin to the appliance or is constructed in one piece therewith, that an eccentric lever acting directly on the insert is provided for securing purposes, that the upper boundary surface of the insert is 0.5 to 1 mm below the upper boundary surface of the mounting support in the inserted state and that the outer portions of the underside of the appliance facing the insert in the inserted state engages on a much broader contour compared with the upper boundary surface of the insert, on the upper boundary surface of the mounting support.

2 Claims, 1 Drawing Sheet

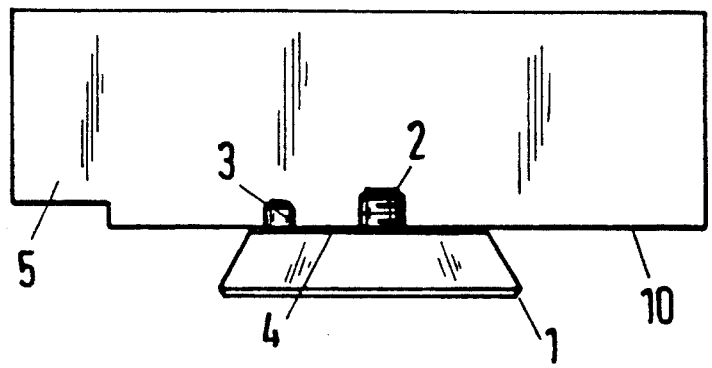
Fig. 1
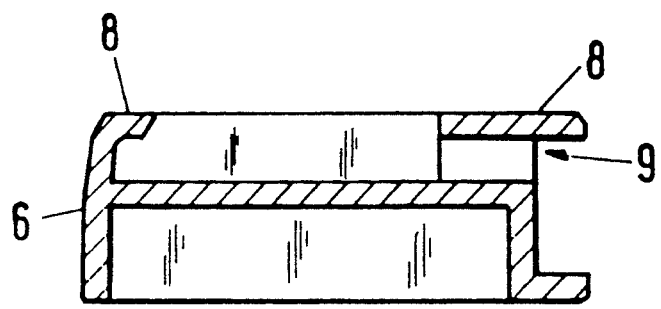
Fig. 2
Fig. 3
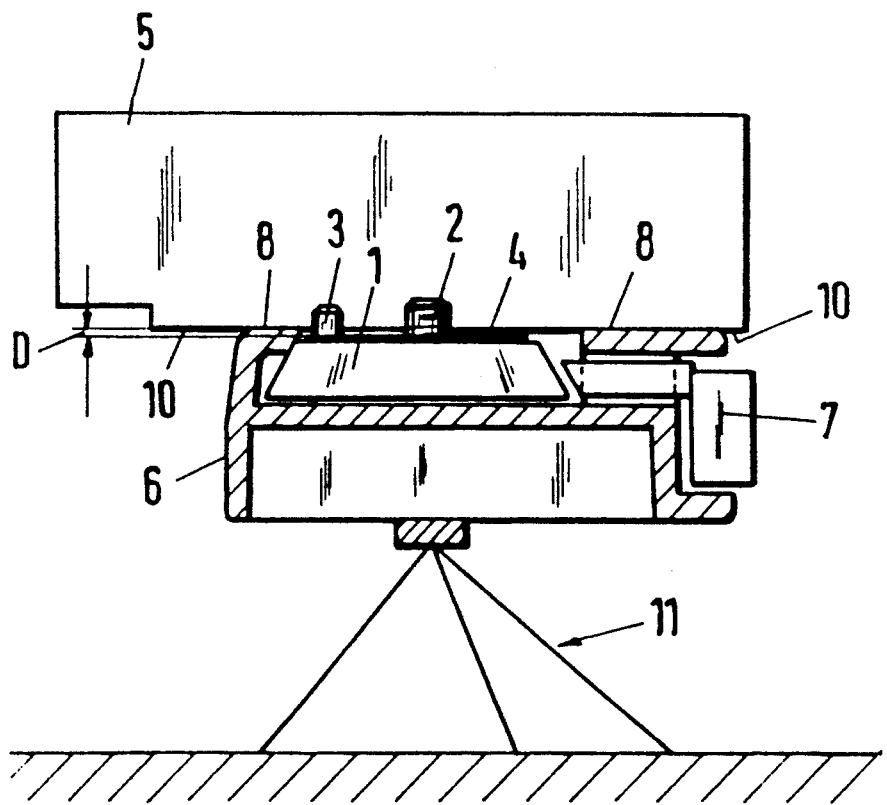

QUICK ATTACHMENT SYSTEM

The invention relates to a quick attachment system.

The most varied instruments and appliances, such as e.g. cameras, control elements or the like are frequently mounted on tripods, etc. Fixing takes place by a screw on the tripod and a corresponding nut on the appliance to be fixed. However, such a construction is difficult to manipulate. The problem also exists, particularly in the open air and at low temperatures, that as a result of cold hands or fingers assembly and disassembly is for from pleasant.

So-called quick attachment systems have been developed, which have an insert for inserting in a mounting support. The insert generally has a square base surface and a trapezoidal cross-section. The insert carries a screw enabling the insert to be fitted to the appliance to be fixed. The insert also carries a pin, which engages in a corresponding recess in the appliance and prevents twisting. Int he screwed-down state the appliance to be fixed engages on the upper boundary surface of the insert. The mounting support is fitted to the tripod to which the appliance is to be fixed. The fixing or fitting of the combined insert and appliance to the mounting support takes place by a sloping insertion and subsequent securing by an eccentric lever.

The problem frequently arises in the aforementioned conventional quick attachment system, that the bearing surface of the appliance to be fixed in the form of the boundary surface of the insert is very small compared with the underside of the appliance, so that in particular large and heavy appliances and instruments are not held firmly enough and consequently tend to tilt. This problem more particularly occurs in the case of plastic cameras due to the elasticity of the material. In the case of video cameras, the consequence is that telephoto shots are regularly blurred.

U.S. Pat. No. 3,549,113 discloses a quick attachment system of the type according to the preamble, in which the insert is constructed as a screw, which has a collar, whose circular face directly surrounding the screw engages on the bottom of the camera or the like. On tightening a claw locking device provided in the mounting support the conically constructed head of the screw serving as an insert is drawn in the direction of the tripod or the like, with which the mounting support is associated, so that, in the immediate vicinity of the screw, the bottom of the appliance is pressed onto the upper boundary surface of the mounting support. Particularly with relatively soft appliance casings, such as e.g. the generally plastic casings for video cameras, etc., there can often be an overstressing of the appliance bottom due to the undefined extent of the inwards movement of the insert screw towards the tripod. It is also not possible to ensure a satisfactory engagement of the appliance on the upper boundary surface of the mounting support facing the appliance, because as a result of the almost punctiform and certainly small-area tightening of the appliance against the mounting support, the underside of the appliance only engages on the boundary surface of the mounting support acing it in a narrow circular face around the insert, so that the parts of the underside of the appliance located further outwards may even bend away and up from the mounting support. This leads to the aforementioned disadvantages of the previously discussed prior art, so that no satisfactory surface contact is ensured between the appliance and the mounting support, so that the appliance can be subject to undesired tilting.

U.S. Pat. No. 3,356,325 discloses a quick attachment system similar to that of the preamble, but in which there is no possibility of tightening the appliance against the facing boundary surface of the mounting support. At the best the appliance engages flat on the facing boundary surface of the mounting support and naturally also on the insert, without any bracing and therefore a more reliable, stable mounting of the appliance being possible.

U.S. Pat. Nos. 4,057,816 and 4,570,887 disclose different mounting possibilities for cameras and the like which, like the quick attachment system according to the preamble can be used for quick attachment purposes, but without solving the aforementioned problems of obtaining high stability and reliable fixing of the appliance using simple means.

Thus, the problem of the present invention is to so further develop the preamble-forming quick attachment system that the appliance can be fixed so as to reliably prevent tilting even in the case of relatively heavy appliances with relatively soft or flexible casings.

As a result of the inventive measure the effective standing surface for the appliance is increased by the upper boundary surface of the mounting support, so that the appliance is directly connected to the tripod or the like, i.e. not via the insert and is consequently held more securely, whilst tilting around the insert part projecting over the mounting support is prevented.

As the upper boundary surface of the insert is located significantly below the upper boundary surface of the mounting support in the inserted state and this takes place by a clearly defined amount as defined in the claim, a bracing of he appliance bottom and consequently an improved mounting are ensured. This more particularly applies if the bottom of the appliance is made from plastic. The connection between the camera and the tripod is further improved by this measure, so that the previously described blurring problem is reliably prevented.

The extent of the height difference between the upper boundary surface of the insert and the upper boundary surface of the mounting support is chosen within the claimed range of 0.5 to 1 mm, as a function of the nature of the appliance to be fixed and the elasticity of the casing bottom.

An embodiment of the invention is described in greater detail hereinafter relative to the attached drawings, wherein show:

FIG. 1 An appliance to be fixed, which is to be fixed to an insert of a quick attachment system according to the invention.

FIG. 2 A mounting support for the quick attachment system of the embodiment of FIG. 1.

FIG. 3 The insert of the embodiment of FIGS. 1 and 2 inserted in the mounting support according to FIG. 2.

According to FIG. 1, an appliance or instrument 5 to be fixed by means of a screw 2 to an insert 1, a pin 3 being provided in order to prevent unintentional twisting of the appliance or instrument on the insert. The underside 10 of the appliance engages on the upper boundary surface 4 of the insert 1. The insert 1 with the appliance 5 located thereon can be inserted from the right in FIG. 2 into an insertion opening 9 of a mounting support 6. In the inserted state the upper boundary surface 8 of the mounting support 6 is substantially parallel to the upper boundary surface 4 of the insert and the underside 10 of the appliance.

According to FIG. 3 the appliance 5 with the outer portions of its underside 10 is almost completely engaged in the upper boundary surface 8 of the mounting support 6 on a tripod. By means of the screw 2 the appliance 5 is only fixed to the insert 1. Due to the fact that the upper boundary surface 4 of the insert 1 is below the upper boundary surface 8 of the mounting support 6 by a height difference D, the bottom of the appliance 5 is slightly braced and therefore firmly connected to the mounting support 6. The height difference D is preferably 0.5 to 1 mm. The insert 1 has a trapezoidal cross-section. An eccentric lever 7 is provided for securing the fixture.

I claim:

1. Quick attachment system for an appliance or instrument, e.g. a camera, having a relatively broad appliance bottom, comprising a mounting support having an opening, an insert disposed in said opening, securing means for securing said insert to the appliance or instrument, said insert having a substantially flat uppermost surface and being trapezoidal in cross-section, an eccentric lever (7) attached to said mounting support and acting directly on said insert for securing said insert in said opening, said mounting support having an uppermost boundary surface (8) and said uppermost surface (4) of said insert (1) being located 0.5 to 1 mm below said boundary surface (8) of said mounting support (6), said uppermost surface of said insert and said boundary surface (8) of said mounting support (6) having a smaller contour than said relatively broad appliance bottom, said uppermost boundary surface (8) being engageable with said appliance bottom and said securing means (2) extending upwardly from said uppermost boundary surface (8).

2. Quick attachment system according to claim 1, wherein said insert (1) is disposed in said opening (9) in the mounting support (6) from a side of said opening, and said opening corresponds to the contour of said insert 1.

* * * * *